(12) United States Patent
Jung et al.

(10) Patent No.: US 10,397,972 B2
(45) Date of Patent: Aug. 27, 2019

(54) METHOD FOR CARRIER AGGREGATION PERFORMED BY TERMINAL IN WIRELESS COMMUNICATION SYSTEM, AND TERMINAL USING SAME METHOD

(71) Applicant: LG ELECTRONICS INC., Seoul (KR)

(72) Inventors: Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/549,639

(22) PCT Filed: Feb. 5, 2016

(86) PCT No.: PCT/KR2016/001360
§ 371 (c)(1),
(2) Date: Aug. 8, 2017

(87) PCT Pub. No.: WO2016/129916
PCT Pub. Date: Aug. 18, 2016

(65) Prior Publication Data
US 2018/0049262 A1    Feb. 15, 2018

Related U.S. Application Data

(60) Provisional application No. 62/113,539, filed on Feb. 9, 2015.

(51) Int. Cl.
*H04W 76/15*    (2018.01)
*H04W 8/24*    (2009.01)
(Continued)

(52) U.S. Cl.
CPC .............. *H04W 76/15* (2018.02); *H04W 8/24* (2013.01); *H04W 36/0069* (2018.08); *H04W 48/12* (2013.01); *H04W 48/20* (2013.01)

(58) Field of Classification Search
None
See application file for complete search history.

(56) References Cited

U.S. PATENT DOCUMENTS

2013/0114505 A1*    5/2013    Haim .................. H04W 52/146
370/328
2013/0201911 A1    8/2013    Bergström et al.
(Continued)

FOREIGN PATENT DOCUMENTS

WO    2013/055108 A2    4/2013

OTHER PUBLICATIONS

Huawei et al., "UL transmission timing difference between TAGs", R2-145094, 3GPP TSG-RAN WG2 Meeting #88, San Francisco, USA, Nov. 17-21, 2014.
(Continued)

*Primary Examiner* — Mohammad S Adhami
(74) *Attorney, Agent, or Firm* — Dentons US LLP

(57) ABSTRACT

The present invention provides a method for carrier aggregation performed by a terminal in a wireless communication system, the method comprising: transmitting information regarding timing difference; and receiving carrier aggregation setting information that is set by means of the information regarding timing difference, wherein the information regarding timing difference is information regarding the timing difference between a primary cell and a secondary cell that can be supported by the terminal.

11 Claims, 14 Drawing Sheets

(51) Int. Cl.
*H04W 48/12* (2009.01)
*H04W 48/20* (2009.01)
*H04W 36/00* (2009.01)

(56) References Cited

U.S. PATENT DOCUMENTS

2014/0050186 A1    2/2014  Kim et al.
2014/0050194 A1    2/2014  Gaal et al.
2015/0327198 A1*  11/2015  Axmon ............. H04W 56/0045
                                                                370/336
2016/0255601 A1*   9/2016  Axmon ............. H04W 56/0045
                                                                370/336

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 V8.0.0 (Dec. 2007).

"3rd Generation Partnership Project; Technical Specification Group Radio Access Network; Evolved Universal Terrestrial Radio Access (E-UTRA); User Equipment (UE) procedures in idle mode (Release 8)", 3GPP TS 36.304 V8.5.0 (Mar. 2009).

* cited by examiner

METHOD FOR CARRIER AGGREGATION PERFORMED BY TERMINAL IN WIRELESS COMMUNICATION SYSTEM, AND TERMINAL USING SAME METHOD

CROSS-REFERENCE TO RELATED APPLICATIONS

This application is the National Stage filing under 35 U.S.C. 371 of International Application No. PCT/KR2016/001360, filed on Feb. 5, 2016, which claims the benefit of U.S. Provisional Application No. 62/113,539 filed on Feb. 9, 2015, the contents of which are all hereby incorporated by reference herein in their entirety.

BACKGROUND OF THE INVENTION

Field of the Invention

The present invention relates to wireless communication, and more particularly, to a method for carrier aggregation performed by a terminal in a wireless communication system, and a terminal using the same method.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA (Orthogonal Frequency Division Multiple Access)/SC-FDMA (Single Carrier-Frequency Division Multiple Access) transmission scheme as a system standard satisfying requirements of IMT-Advanced. The LTE-A is one important candidate for IMT-Advanced.

An LTE-A system adopts carrier aggregation (CA) and in this case, the carrier aggregation means aggregating multiple component carriers (CCs) and receiving and transmitting the aggregated component carriers (CCs). The component carriers may be divided into a primary component carrier (PCC) and a secondary component carrier (SCC). The primary component carrier (PCC) may be referred to as a primary cell (Pcell). In addition, other component carriers other than one primary component carrier (PCC) may be defined as the secondary component carrier (SCC), the secondary component carrier may be referred to as a secondary cell (SCell), and a terminal may perform uplink transmission through the secondary cell.

In the secondary cell in a carrier aggregation system, a timing difference is determined based on the primary cell. When the terminal performs the uplink transmission through the secondary cell, there is a problem in that the efficiency of the carrier aggregation deteriorates when the UE performs the uplink transmission through the secondary cell even though the timing difference between the primary cell and the secondary cell is excessively large. In addition, there is a problem in that a network cannot decode data received from the terminal through the secondary cell and the network recognizes the data received from the terminal through the secondary cell as interference when the timing difference between the primary cell and the secondary cell is excessively large.

SUMMARY OF THE INVENTION

The present invention provides a method for carrier aggregation (CA) performed by a terminal in a wireless communication system, and a terminal using the same method.

In an aspect, a method for carrier aggregation performed by a user equipment (UE) in a wireless communication system is provided. The method comprises transmitting information regarding a timing difference, and receiving carrier aggregation setting information that is set by the information regarding the timing difference, wherein the information regarding the timing difference is information regarding the timing difference between a primary cell and a secondary cell that is supported by the UE.

The information regarding the timing difference may be included in a message indicating a UE capability which the UE reports to a network.

The information regarding the timing difference may include information regarding an uplink timing difference for each band combination which is enabled to be supported by the UE.

A timing difference having a specific value may be previously configured in the UE, and the information regarding the timing difference is information indicating a value of a timing difference additionally supported by the UE as compared with the timing difference having the specific value.

The transmitting of the information regarding the timing difference may include not transmitting the information regarding the timing difference when the UE supports only a timing difference less than a predetermined value, and transmitting the information regarding the timing difference when the UE supports only a timing difference equal to or more than a predetermined value.

The timing difference between the primary cell and the secondary cell configured by the carrier aggregation configuration information may have a value within the timing difference which is enabled to be supported by the UE.

The information regarding the timing difference may be information regarding a timing difference observed by the UE.

The information regarding the timing difference observed by the UE may be information regarding an uplink timing difference observed for each band combination which is enabled to be supported by the UE.

The information regarding the timing difference observed by the UE may be reported by an instruction of the network.

When a reporting event is met, the information regarding the timing difference observed by the UE may be reported.

In another aspect, a user equipment (UE) is provided. The UE comprises a radio frequency (RF) unit transmitting and receiving a radio signal and a processor operated in association with the RF unit, wherein the processor is configured to transmit information regarding a timing difference, and receive carrier aggregation configuration information that is configured by the information regarding the timing difference, and the information regarding the timing difference is information regarding the timing difference between a primary cell and a secondary cell that is supported by the UE.

According to the present invention, provided are a method for carrier aggregation (CA) performed by a terminal in a wireless communication system, and a terminal using the same method.

According to the present invention, when the terminal performs the carrier aggregation, the terminal itself can announce information regarding a timing difference, which is supportable to a network and the network can generate a combination of cells in which the carrier aggregation is available based on the information regarding the timing difference, which the terminal itself can support.

According to the present invention, the terminal can transmit to the network maximum inter-cell timing difference information which the terminal can combine or an inter-cell timing difference observed by the terminal and the network can generate the combination of the cells in which the carrier aggregation is available based on the inter-cell timing difference received from the terminal.

DESCRIPTION OF EXEMPLARY
EMBODIMENTS

Figure 1:
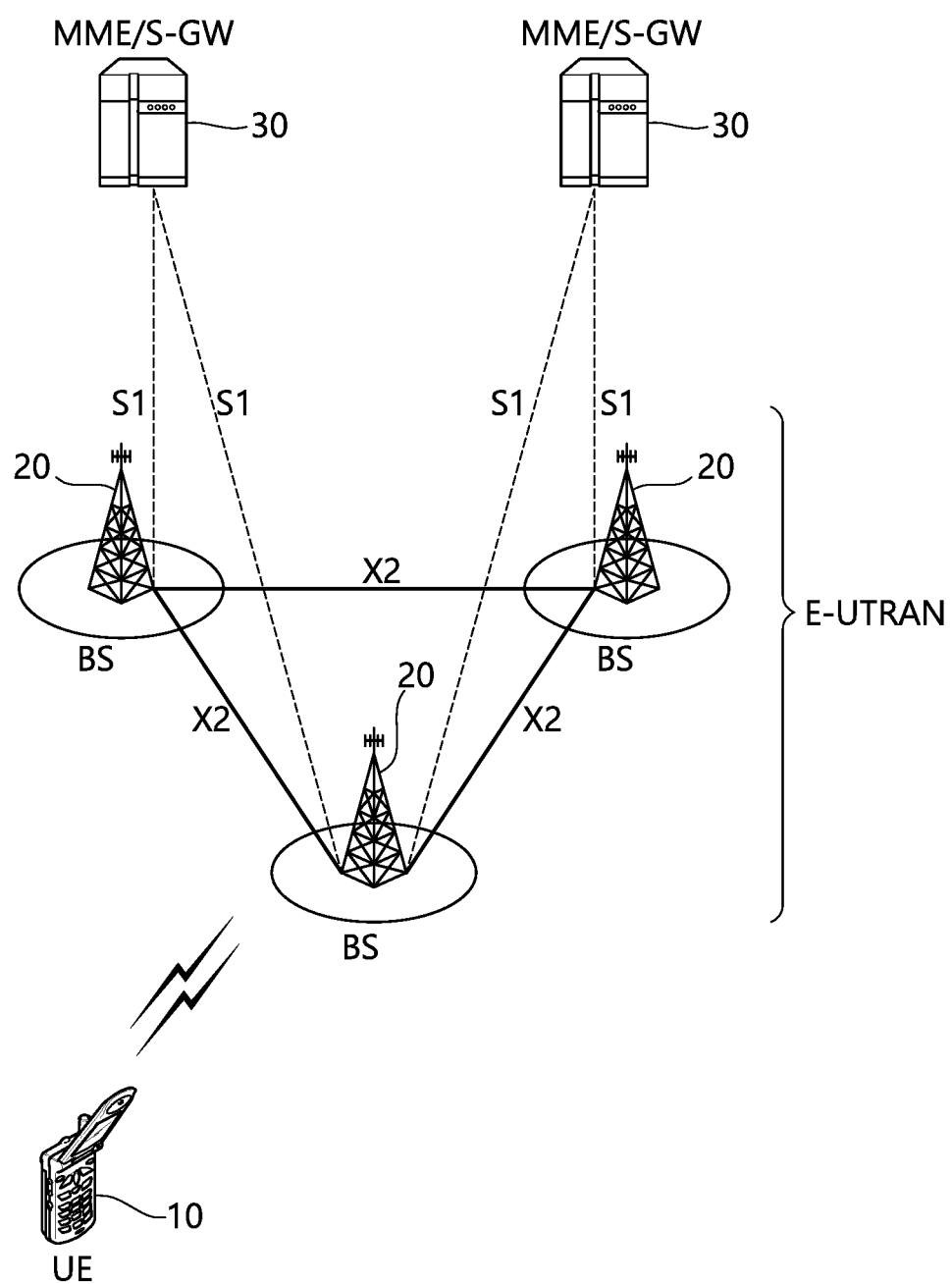
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
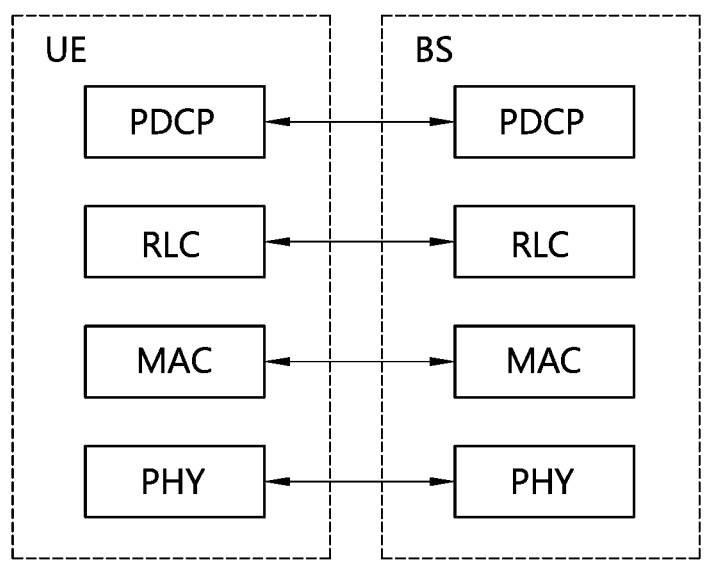
FIG. 2 is a diagram showing a wireless protocol architecture for a user plane.
Figure 3:
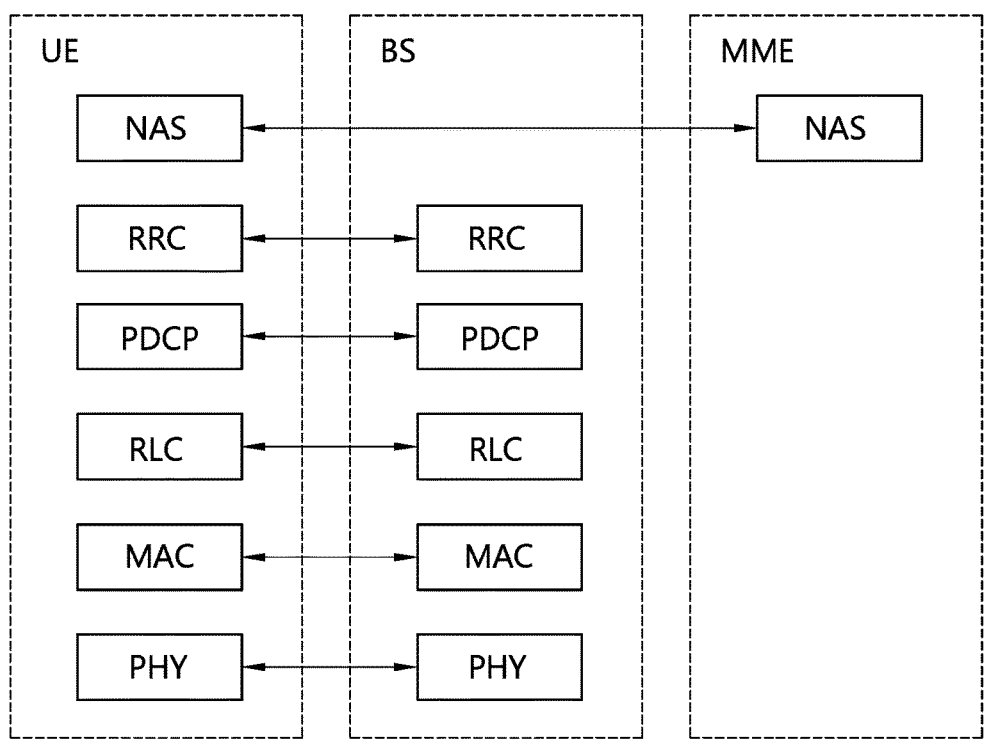
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization.

The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
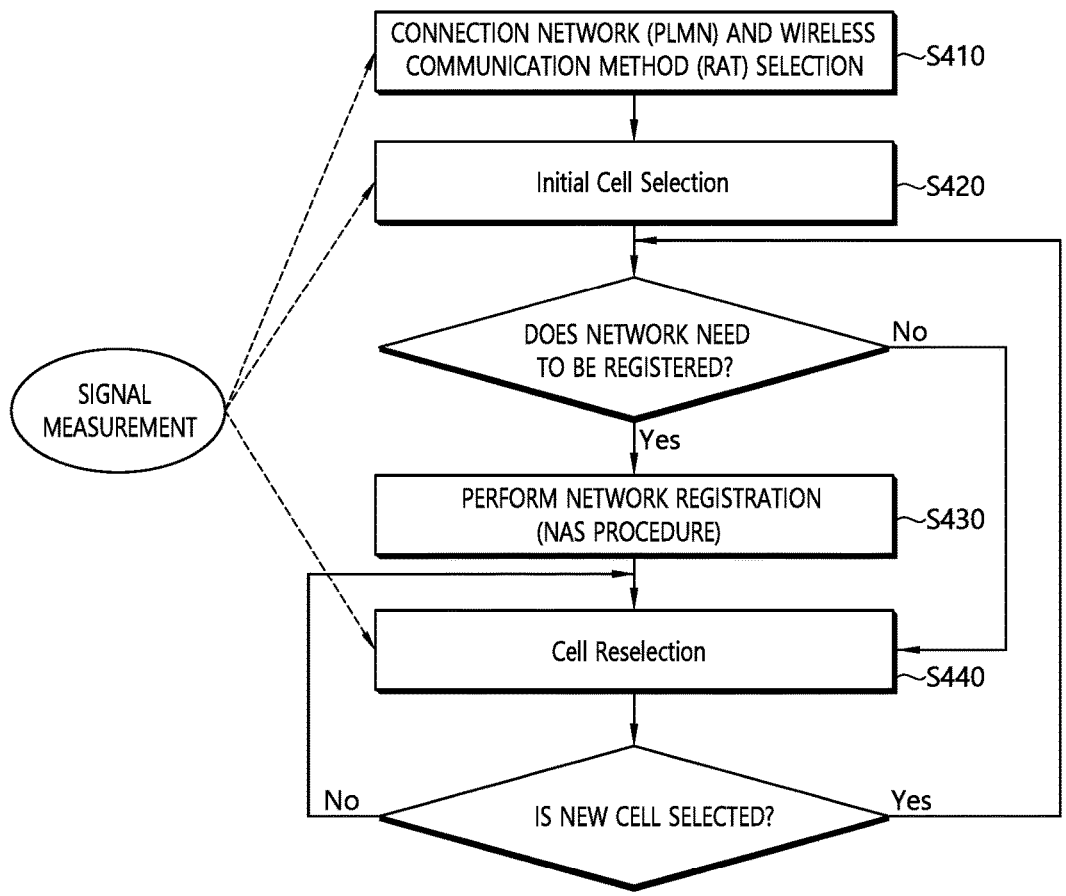
FIG. 4 is a flowchart illustrating the operation of UE in the RRC idle state

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
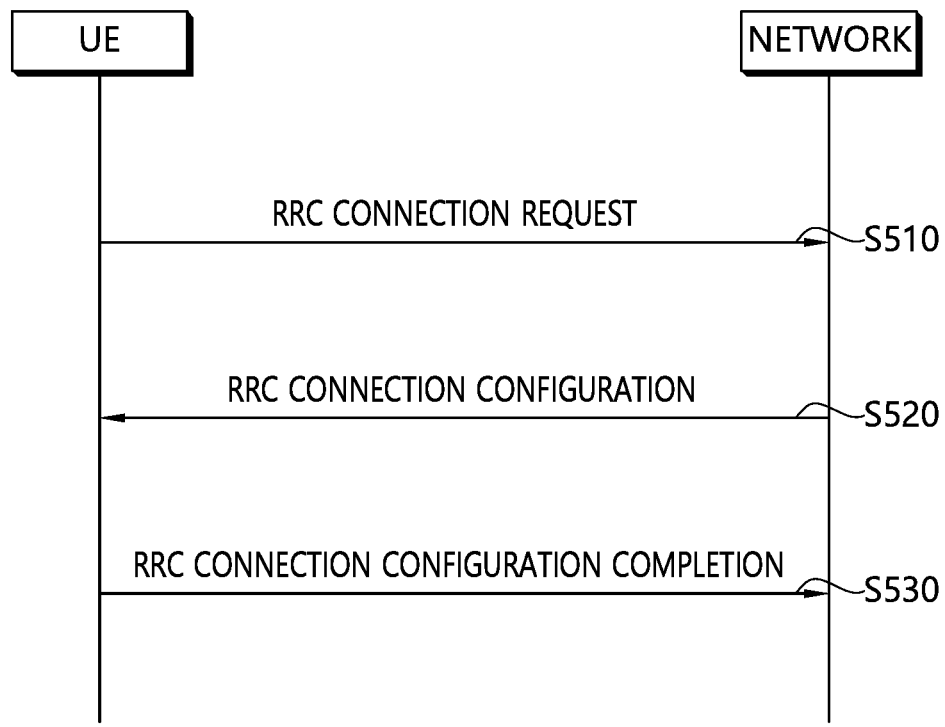
FIG. 5 is a flowchart illustrating a process of establishing RRC connection.

FIG. 5 is a flowchart illustrating a process of establishing RRC connection.

The UE transmits an RRC connection request message for requesting the RRC connection to the network (S510) and in this case, the UE may be in an RRC idle state. Further, the UE may start a timer at the time of transmitting the RRC connection request message to the network and in this case, the timer may be T300 of 3GPP TS 36.331.

The network transmits an RRC connection setup message as a response to the RRC connection request (S520). The UE enters an RRC connection mode after receiving the RRC connection setup message. In this case, the UE may stop the timer which is started in step S510.

The UE transmits to the network an RRC connection setup complete message used for verifying successful completion of RRC connection establishment (S530).

Figure 6:
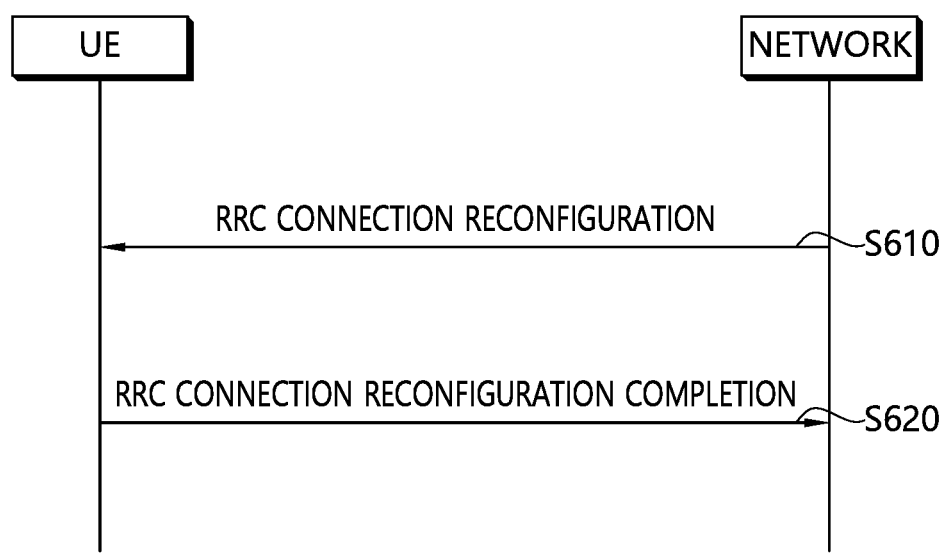
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610).

As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev > 0 \text{ AND } Squal > 0, \quad [\text{Equation 1}]$$

where $$Srxlev = Q_{rxlevmeas} - (Q_{rxlevmin} + Q_{rxlevminoffset}) - P_{compensation},$$

$$Squal = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$Rs=Q\text{meas},s+Q\text{hyst}, Rn=Q\text{meas},n-Q\text{offset} \quad [\text{Equation 2}]$$

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
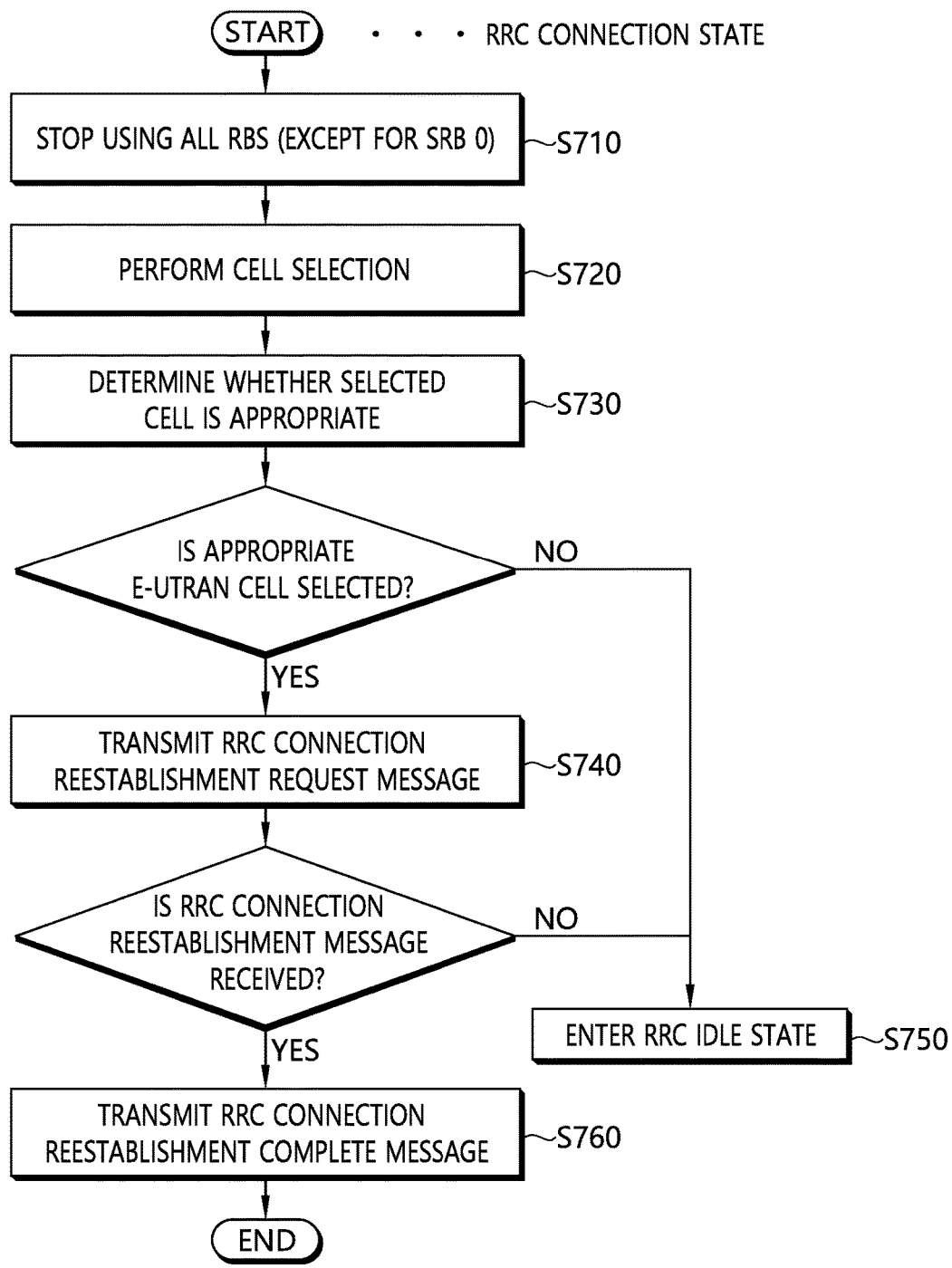
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
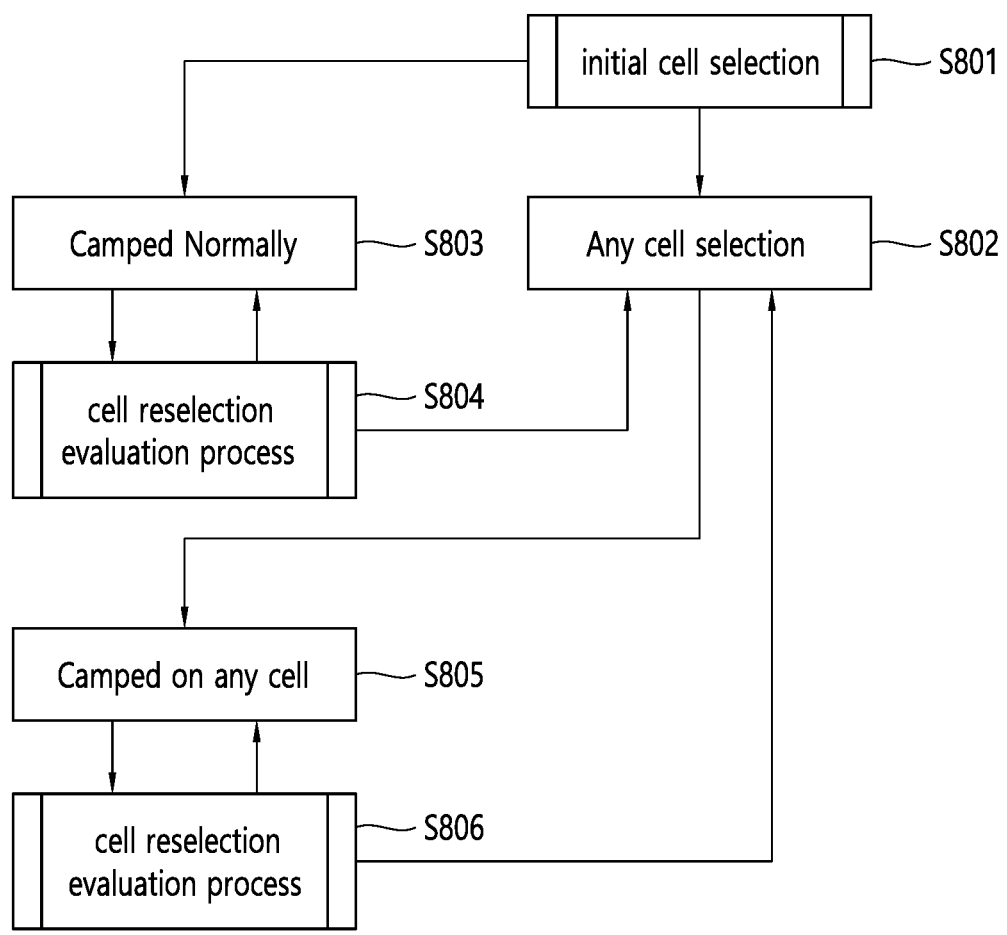
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, RRC connection failure and the timer will be described.

Figure 9:
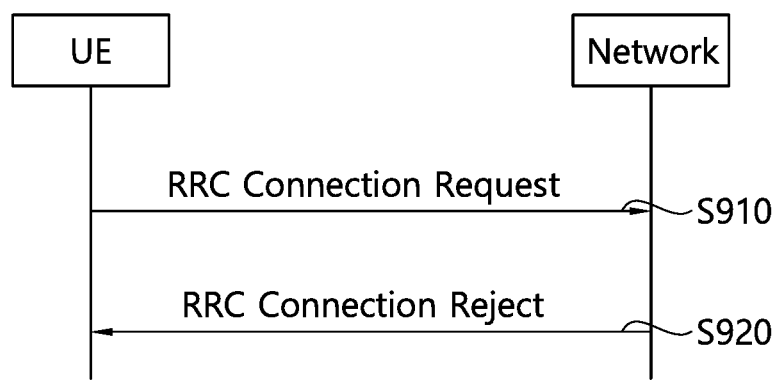
FIG. 9 is a flowchart illustrating a process in which the network rejects the RRC connection.

FIG. 9 is a flowchart illustrating a process in which the network rejects the RRC connection.

Referring to FIG. 9, the UE may transmit the RRC connection request message to the network (S910). The UE may start the timer at the time of transmitting the RRC connection request message to the network and in this case, the timer may be T300 of 3GPP TS 36.331.

The network may transmit an RRC connection reject message as the response to the RRC connection request (S920). In this case, when the UE receives the RRC connection reject message, the UE may stop the timer started in step S910.

The timers may be summarized as shown in Table 2 below.

TABLE 2

| Timer | Start | Stop | At expiry |
|---|---|---|---|
| T300 | Transmission of RRCConnectionRequest | Reception of RRCConnectionSetup or RRCConnectionReject message, cell re-selection and upon abortion of connection establishment by upper layers | Perform the actions as specified in 5.3.3.6. |
| T301 | Transmission of RRCConnectionReestabilshmentRequest | Reception of RRCConnectionReestablishment or RRCConnectionReestablishmentReject message as well as when the selected cell becomes unsuitable | Go to RRC_IDLE. |
| T302 | Reception of RRCConnectionReject while performing RRC connection establishment | Upon entering RRC_CONNECTED and upon cell re-selection | Inform upper layers about barring alleviation as specified in 5.3.3.7. |
| T303 | Access barred while performing RRC connection establishment for mobile originating calls. | Upon entering RRC_CONNECTED and upon cell re-selection | Inform upper layers about barring alleviation as specified in 5.3.3.7. |
| T304 | Reception of RRCConnectionReconfiguration message including the MobilityControl Info or reception of MobilityFromEUTRACommand message including CellChangeOrder | Criterion for successful completion of handover within E-UTRA, handover to E-UTRA or cell change order is met (the criterion is specified in the target RAT in case of inter-RAT) | In case of cell change order from E-UTRA or intra E-UTRA handover, initiate the RRC connection re-establishment procedure; In case of handover to E-UTRA, perform the actions defined in the specifications applicable for the source RAT. |
| T305 | Access barred while performing RRC connection establishment for mobile originating signalling. | Upon entering RRC_CONNECTED and upon cell re-selection | Inform upper layers about barring alleviation as specified in 5.3.3.7. |
| T306 | Access barred while performing RRC connection establishment for mobile originating CS fallback. | Upon entering RRC_CONNECTED and upon cell re-selection | Inform upper layers about barring alleviation as specified in 5.3.3.7. |
| T310 | Upon detecting physical layer problems i.e. upon receiving N310 consecutive | Upon receiving N311 consecutive in-sync indications from lower layers, | If security is not activated: go to RRC_IDLE else: |

TABLE 2-continued

| Timer | Start | Stop | At expiry |
|---|---|---|---|
| | out-of-sync indications from lower layers | upon triggering the handover procedure and upon initiating the connection re-establishment procedure | initiate the connection re-establishment procedure. |
| T311 | Upon initiating the RRC connection re-establishment procedure | Selection of a suitable E-UTRA cell or a cell using another RAT | Enter RRC_IDLE. |
| T320 | Upon receiving t320 or upon cell (re)selection to E-UTRA from another RAT with validity time configured for dedicated priorities (in which case the remaining validity time is applied) | Upon entering RRC_CONNECTED, when PLMN selection is performed on request by NAS, or upon cell (re)selection to another RAT (in which case the timer is carried on to the other RAT) | Discard the cell reselection priority information provided by dedicated signalling. |
| T321 | Upon receiving measConfig including a reportConfig with the purpose set to reportCGI | Upon acquiring the information needed to set all fields of cellGlobalId for the requested cell, upon receiving measConfig that includes removal of the reportConfig with the purpose set to reportCGI | Initiate the measurement reporting procedure, stop performing the related measurements and remove the corresponding measId. |
| T325 | Timer (re)started upon receiving RRCConnectionReject message with deprioritisationTimer. | | Stop deprioritisation of all frequencies or E-UTRA signalled by RRCConnectionReject. |
| T330 | Upon receiving LoggedMeasurementConfiguration message | Upon log volume exceeding the suitable UE memory, upon initiating the release of LoggedMeasurementConfiguration procedure | Perform the actions specified in 5.6.6.4 |
| T340 | Upon transmitting UEAssistanceInformation message with powerPrefIndication set to normal | Upon initiating the connection re-establishment procedure | No action. |

Hereinafter, the present invention will be described in detail.

An LTE-A system adopts carrier aggregation (CA) and in this case, the carrier aggregation means aggregating multiple component carriers (CCs) and receiving and transmitting the aggregated component carriers (CCs). Through the carrier aggregation, the LTE system enhances a transmission bandwidth of the UE and increases use efficiency of the frequency.

The component carriers may be divided into a primary component carrier (PCC) and a secondary component carrier (SCC). The primary component carrier (PCC) is a component carrier that becomes the center of management of the component carrier when using multiple component carriers and one primary component carrier (PCC0 is defined for each UE. The primary component carrier (PCC) may be referred to as a primary cell (Pcell).

In addition, other component carriers other than one primary component carrier (PCC) may be defined as the secondary component carrier (SCC), the secondary component carrier may be referred to as a secondary cell (SCell), and a UE may perform uplink transmission through the secondary cell.

In the case of the secondary cell in the carrier aggregation system, a timing difference is determined based on the primary cell and when the primary cell and the secondary cell are present, the timing difference may mean a timing difference between the time when the UE transmits a signal through the primary cell and the time when the secondary cell transmits the signal through the secondary cell.

The UE may perform the uplink transmission through the secondary cell as described above. In this case, even though the timing difference between the primary cell and the secondary cell is excessively large, the UE performs the uplink transmission through the secondary cell, and as a result, the efficiency of the carrier aggregation may deteriorate. In addition, a network cannot decode data received from the UE through the secondary cell and the network recognizes the data received from the UE through the secondary cell as interference when the timing difference between the primary cell and the secondary cell is excessively large.

As a method for solving the problem, the network may predict an operation of the UE, which is related with the timing difference. In this case, in order to guarantee that the operation of the UE is predicted for the network (e.g., eNB), the network needs to know when the uplink transmission stops due to a problem of the timing difference related with the uplink transmission. However, since the UE may stop the uplink transmission due to another problem other than the timing difference problem, detecting that the UE stops the uplink transmission by the network may not be a sufficient prediction method. For example, the UE performs the uplink transmission and when an uplink channel is temporarily deteriorated, the network may detect that the uplink transmission of the UE stops. As another example, the network transmits a grant to the UE and on the PDCCH and when link adaptation to the PDCCH is excessively optimistic, the UE loses the grant, and as a result, the UE may not perform the uplink transmission. In order to solve the problems other than the timing difference problem, the base station preferably applies robustness for subsequent transmission rather than deconfiguring the secondary cell.

As another example in which the network predicts the operation of the UE, which is related with the timing difference, when the uplink transmission of the UE stops due to the timing difference problem of the uplink transmission, the UE may transmit to the network information indicating that the uplink transmission of the UE stops due to the timing difference problem of the uplink transmission. In addition, the UE is enabled to deconfigure a cell (that is, a cell I which the timing difference problem occurs) which is problematic. When the information indicating that the uplink transmission of the UE stops due to the timing difference problem is not reported, the base station may not know when a timing advance timer (TAT) abruptly stops and whether the network transmits a timing advance command medium access control control element (TAC MAC CE) after the TAT stops. In addition, in this case, in spite of the moment when the UE stops the TAT, when the UE receives a timing advance command (TAC) which is a command for instructing to start the TAT, an action which the UE needs to take becomes unclear.

The methods in which the network predicts the operation of the UE, which is related with the timing difference is just reporting problems which already occur to the network by the UE. In other words, the methods do not prevent the problems related with the timing difference.

In order to prevent the problem related with the timing difference, a maximum value for the timing difference between the primary cell and the secondary cell may be determined. When a value of the timing difference between the primary cell and the secondary cell is larger than the maximum timing difference value, the UE stops the TAT for the secondary cell to stop the uplink transmission of the UE through the secondary cell. In this case, the TAT means information indicating to what extend the UE applies uplink time adjustment set by a timing advance (TA) and the timing advance means a difference between uplink and downlink of the UE.

The maximum value of the timing difference may be, for example, 32.47 μs. According to one example, when the timing difference between the primary cell and the secondary cell is less than 32.47 μs, the UE may perform the uplink transmission through the secondary cell and when the timing difference between the primary cell and the secondary cell, that is, the timing difference value is more than 32.47 μs, the UE may stop the uplink transmission through the secondary cell.

In this case, the maximum value of the timing difference, that is, the maximum timing difference is just a minimum requirement of the UE. That is, the UE needs to only support the uplink transmission in the carrier aggregation according to the maximum timing difference and it is not impossible for the UE to support the uplink transmission in the carrier aggregation even when the timing difference exceeds the maximum timing difference. As a result, a specific UE may support the uplink transmission through the secondary cell in the carrier aggregation even when the timing difference is equal to or more than the maximum timing difference. For example, in the network, some UEs may support the maximum timing difference only up to 32.47 μs, some UEs may support the maximum timing difference up to 40 μs, and some UEs may support the maximum timing difference even up to 50 μs.

As described above, since the maximum timing difference value is just the minimum requirement, when the UE supports the uplink transmission in the carrier aggregation at the timing difference (e.g., 40 s) which is more than a predetermined maximum timing difference (e.g., 32.47 s), the UE may preferably perform the uplink transmission through the secondary cell within the timing difference supported by the UE itself rather than limiting the uplink transmission of the UE in the carrier aggregation.

Therefore, while the UE supports the timing difference between specific cells, the carrier aggregation is preferably permitted between the two specific cells. That is, even though the timing difference between the primary cell and the secondary cell is larger than the maximum timing difference, when the UE supports the timing difference between the primary cell and the secondary cell, which is larger than the maximum timing difference, the carrier aggregation between the primary cell and the secondary cell is preferably permitted for the UE.

As one example, when the UE supports the timing difference at most up to 45 μs, the UE performs the carrier aggregation between the cells having the timing difference within 45 μs to perform the uplink transmission. However, when the maximum timing difference is set to, for example, 32.47 μs as described above and the network is never permitted to perform the carrier aggregation between the cells, which is more than the maximum timing difference (alternatively, when the carrier aggregation between the cells, which is more than the maximum timing difference is permitted only an extremely exceptional case), the network may not know that the UE supports the timing difference at most up to 45 μs, and as a result, the network may only suppose that the UE supports the timing difference only up to 32.47 μs. Therefore, the network and the UE lose an opportunity in which the carrier aggregation may be achieved between the cells in which the timing difference is between 32.47 μs and 45 μs. In other words, since a supplier needs to guarantee that the timing difference for the network thereof never exceeds 32.47 μs, all potential capabilities of the network and the UE may not be shown, which the supplier may provide. As such, when the supplier enables the uplink transmission with respect to all regions, that is, all timing differences, the case where the timing difference which may be supported by the UE is more than the maximum timing difference ma not be a rare case.

Therefore, when the UE is capable of performing the carrier aggregation (that is, when the UE is capable of performing the carrier aggregation of the primary cell and the secondary cell even when the timing difference of the primary cell and the secondary cell is larger than the maximum timing difference) even in the case where the timing difference is more than the predetermined maximum timing difference, a method in which the UE provides the carrier aggregation even to the primary cell and the secondary cell in which the timing difference is more than the maximum timing difference will be described in detail.

Figure 10:
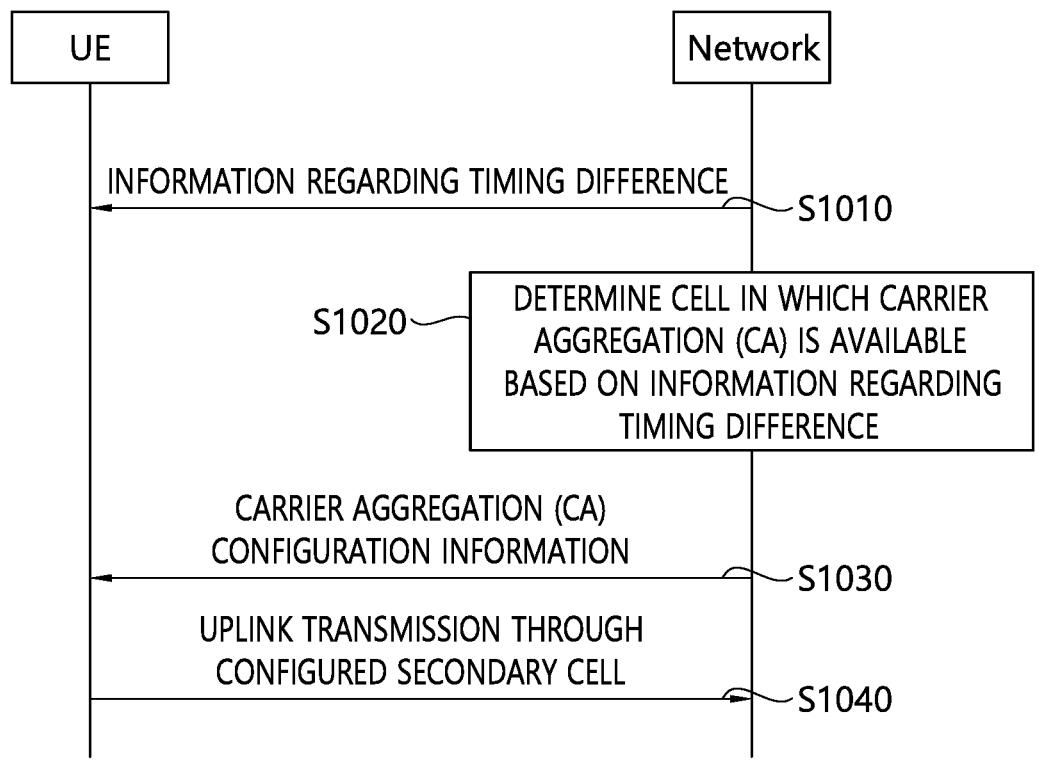
FIG. 10 is a flowchart of a carrier aggregation method based on a timing difference according to an embodiment of the present invention.

FIG. 10 is a flowchart of a carrier aggregation method based on a timing difference according to an embodiment of the present invention.

According to FIG. 10, a UE may transmit information regarding a timing difference to a network (S1010). The information regarding the timing difference may include 1) information indicating an additional capability to support a timing difference supported by the UE and 2) information indicating the timing difference among cells (i.e., when the cells are positioned in different carriers among a plurality of carriers) observed by the UE. Detailed information regarding the timing difference will be described below.

The network determines a cell in which the carrier aggregation (CA) may be performed based on the information regarding the timing difference, which is received from the UE. That is, the network may determine a combination of the carrier aggregation which may be configured for the UE based on the information regarding the timing difference, which is received from the UE. In other words, the network may determine a combination of the primary cell and the secondary cell which may be configured for the UE based on the information regarding the timing difference, which is received from the UE. Hereinafter, a detailed example of determining the cell in which the carrier aggregation may be performed based on the information regarding the timing difference, which is received from the UE.

The UE may receive carrier aggregation information from the network (S1030). In this case, the carrier aggregation information received by the UE may mean information regarding the carrier aggregation configured for the UE, in other words, mean information regarding the primary cell and the secondary cell configured for the UE. Herein, a detailed example in which the UE receives the carrier aggregation information from the network will be described below.

Thereafter, the UE may perform the uplink transmission through the secondary cell configured for the UE (S1040). In this case, the case where the UE performs the uplink transmission through the secondary cell configured for the UE does not correspond to a required component in the present invention.

Figure 11:
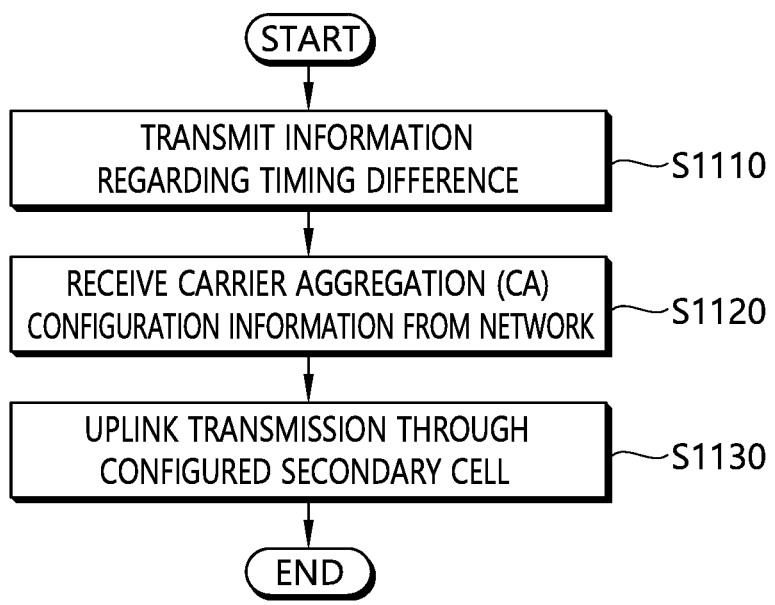
FIG. 11 is a flowchart of a carrier aggregation method based on a timing difference according to another embodiment of the present invention.

FIG. 11 is a flowchart of a carrier aggregation method based on a timing difference according to another embodiment of the present invention.

According to FIG. 11, the UE may transmit the information regarding the timing difference to the network (S1110). In this case, the information regarding the timing difference, which is transmitted by the UE may include 1) information indicating an additional capability to support a timing difference supported by the UE and 2) information indicating the timing difference among cells (i.e., when the cells are positioned in different carriers among a plurality of carriers) observed by the UE as described above and the detailed information regarding the timing difference will be described below.

Thereafter, the UE may receive carrier aggregation configuration information from the network (S1120). The carrier aggregation configuration information which the UE receives from the network may include information regarding the primary cell and the secondary cell allocated to the UE and hereinafter, a detailed example in which the UE receives the carrier configuration information from the network will be described below.

The UE may perform the uplink transmission through the configured secondary cell (S1130). In this case, the case where the UE performs the uplink transmission is not the required component in the present invention as described above.

Hereinafter, the embodiment of the carrier aggregation method based on the timing difference according to 1) the information indicating the additional capability to support the timing difference supported by the UE and 2) the information indicating the timing difference among the cells (i.e., when the cells are positioned in different carriers among the plurality of carriers) observed by the UE will be described in detail with reference to a drawing.

Figure 12:
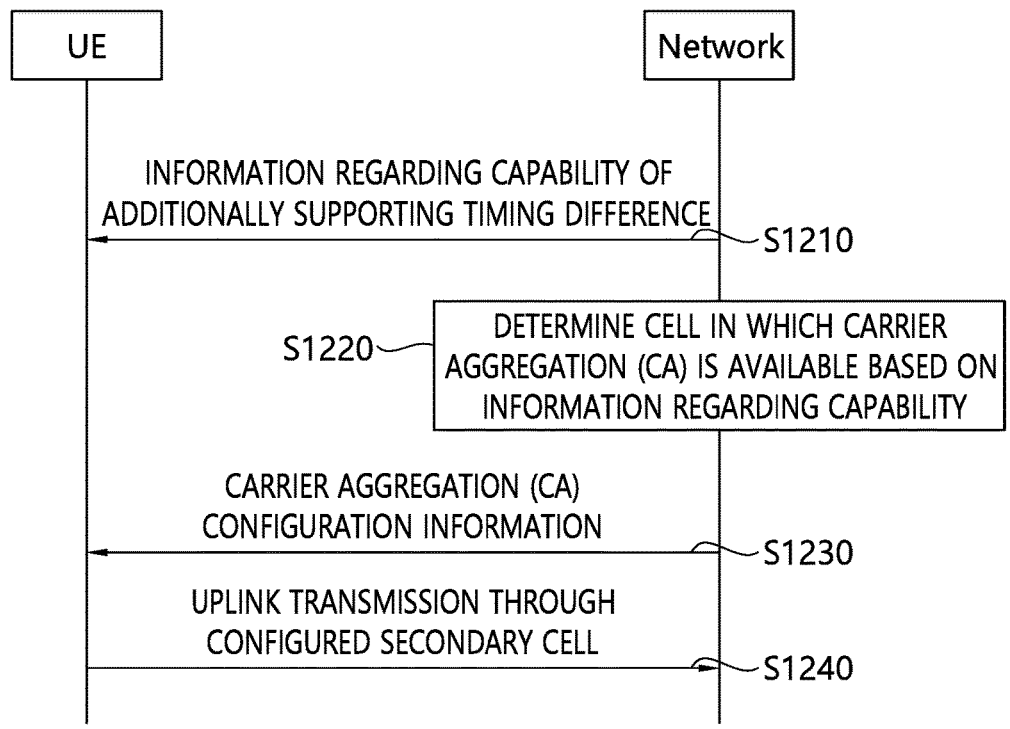
FIG. 12 is a flowchart of a carrier aggregation method based on information additionally indicating a capability of the timing difference according to an embodiment of the present invention.

FIG. 12 is a flowchart of a carrier aggregation method based on information additionally indicating a capability of the timing difference according to an embodiment of the present invention.

According to FIG. 12, the UE may transmit information regarding an additional capability of supporting the timing difference to the network (S1210).

In more detail, the information indicating the additional capability of supporting the timing difference may include information indicating a capability itself related with the timing difference supported by the UE. That is, the UE may transmit the timing difference which may be supported by the UE to the network. For example, when the value of the timing difference between the primary cell and the secondary cell, which is supported by the UE is present as a predetermined value, the UE may transmit the predetermined timing difference supported by the UE to the network.

Further, the information indicating the additional capability of supporting the timing difference may include information indicating the capability related with the timing difference. That is, the UE may transmit a timing difference which may be additionally supported by the UE to the network. In this case, the timing difference which may be additionally supported by the UE may mean a value of the timing difference which may be additionally supported by the UE as compared with the maximum timing difference value, in other words, the timing difference which may be additionally supported by the UE may mean a difference value between the timing difference which may be supported by the UE and the maximum timing difference. For example, when the timing difference value which may be supported by the UE is 42.47 µs and the maximum timing difference value is 32.47 µs, the value of the timing difference which may be additionally supported by the UE may be 10 µs. The maximum timing difference means a minimum capability value required for the UE and hereinafter, 'the maximum timing difference' and 'the minimum timing difference required for the UE' may be mixedly used for easy description.

Further, the information indicating the additional capability of supporting the timing difference may include information indicating the capability related with the timing difference. That is, the UE may transmit a timing difference which may be additionally supported by the UE to the network. In this case, the timing difference which may be additionally supported by the UE may mean a value of the timing difference which may be additionally supported by the UE as compared with the maximum timing difference value, in other words, the timing difference which may be additionally supported by the UE may mean a difference value between the timing difference which may be supported by the UE and the maximum timing difference. For example, when the timing difference value which may be supported by the UE is 42.47 µs and the maximum timing difference value is 32.47 µs, the value of the timing difference which may be additionally supported by the UE may be 10 µs. The maximum timing difference means a minimum capability value required for the UE and hereinafter, 'the maximum timing difference' and 'the minimum timing difference required for the UE' may be mixedly used for easy description.

As one of other methods for indicating the capability, only when the supported timing difference is more than a threshold, the UE may indicate the maximum timing difference or the timing difference which may be supported by the UE. Further, only when the timing difference supported by the UE is more than the threshold, the UE may support the value of the timing difference which may be additionally supported by the UE. The threshold may be set by the network or the threshold may be previously set in the UE. In this case, the threshold is preferably larger than a value to support a minimum performance request.

In regard to signaling granularity,

The UE may indicate the additional capability related with the timing difference supported per user equipment (UE). In this case, the UE may indicate a minimum value of the timing difference which may be supported in a combination of two or more predetermined cells in each band.

The UE may indicate the additional capability related with the timing difference supported per band combination indicated. In this case, the UE may indicate the additional capability of the UE in respect to the supported timing difference according to each supported band combination in association with each band combination.

The UE may indicate the timing difference of two cells indicated by the network. That is, the network may indicate two cells with respect to the UE and the UE may indicate the timing difference of two cells indicated by the network.

When the UE does not transmit to the network the information regarding the additional capability of supporting the timing difference, this may mean that the UE supports the minimum performance request and mean that the additional capability related with the supported timing difference is not considered by the network. That is, when the UE does not transmit to the network the information regarding the additional capability of supporting the timing difference, this may mean that the UE supports only the maximum timing difference (e.g., 32.47 μs).

The network determines a cell in which the carrier aggregation (CA) may be performed based on the information regarding the capability of additionally supporting the timing difference, which is received from the UE (S1220). That is, the network may determine a combination of the carrier aggregation which may be configured for the UE based on the information regarding the capability of additionally supporting the timing difference, which is received from the UE. In other words, the network may determine a combination of the primary cell and the secondary cell which may be configured for the UE based on the information regarding the capability of additionally supporting the timing difference, which is received from the UE.

The carrier aggregation combination which the network may configure for the UE may include the carrier aggregation between the cells having the timing difference which is the more than the maximum timing difference. That is, the network may perform the carrier aggregation between the cells within a timing difference of a limit which may be supported by the UE. For example, when the timing difference which may be supported by the UE is 40 μs and the value of the timing difference between a first cell and a second cell is not more than 40 μs, the network may permit the carrier aggregation between the first and second cells. In other words, the case means that the network permits the carrier aggregation between the first and second cells even though the timing difference between the first and second cells is more than the maximum timing difference value (e.g., 32.47 μs).

When the network receives the information regarding which may be additionally supported by the UE from the UE (that is, when the network receives information indicating that the value of the timing difference value which may be additionally supported by the UE, which is larger than the maximum timing difference is present), the network may perform the carrier aggregation based on the timing difference (that is, a predetermined maximum timing difference+ the timing difference which may be additionally supported by the UE) which may be supported by the UE similarly as described above. For example, when the maximum timing difference is set to 32.47 μs and the timing difference which may be additionally supported by the UE is 7.53 μs, the network may perform the carrier aggregation between the cells having the timing difference within 40 μs.

The UE may receive carrier aggregation configuration information from the network (S1230). In this case, the carrier aggregation configuration information may include information regarding the primary cell and the secondary cell in the carrier aggregation configured for the UE.

In more detail, the carrier aggregation configuration information which the network configures for the UE may be carrier aggregation configuration information configured based on information regarding a capability of additionally supporting the timing difference which the UE configures for the network. In other words, the carrier aggregation configuration information may mean information configured based on the regarding the capability of additionally supporting the timing difference. That is, the carrier aggregation configuration information may mean information regarding aggregation of the cells within the timing difference which may be supported by the UE and the carrier aggregation configuration information may mean information regarding an aggregation combination for the cells over the maximum timing difference. Further, the carrier aggregation configuration information may mean information regarding the aggregation combination between the cells over the maximum timing difference and within the timing difference which may be supported by the UE. In this case, the carrier aggregation configuration information may include the information regarding the primary cell and the secondary cell configured for the UE and the timing difference between the primary cell and the secondary cell has a value within the timing difference which may be supported by the UE.

Thereafter, the UE may perform the uplink transmission through the secondary cell configured for the UE (S1240). Detailed contents regarding the case where the UE performs the uplink transmission through the secondary cell are described above.

Figure 13:
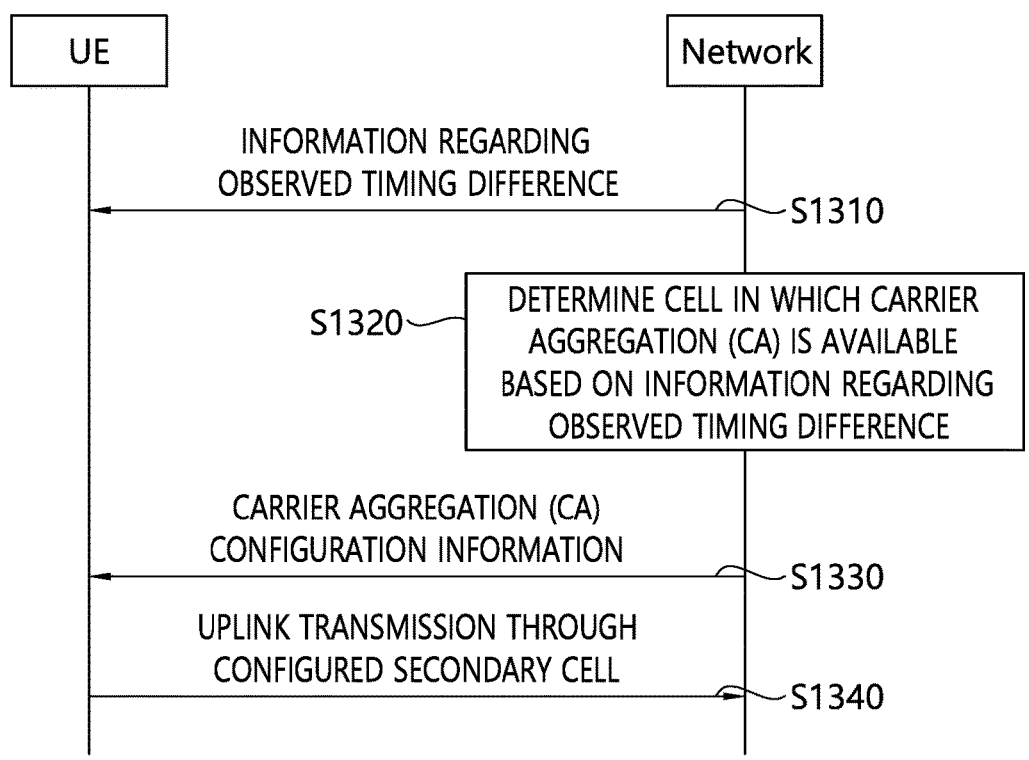
FIG. 13 is a flowchart of a carrier aggregation method based on information regarding an observed timing difference according to an embodiment of the present invention.

FIG. 13 is a flowchart of a carrier aggregation method based on information regarding an observed timing difference according to an embodiment of the present invention.

According to FIG. 13, the UE may transmit information regarding an observed timing difference to the network (S1310).

In more detail, the UE may report or transmit an observed uplink timing difference according to each band combination which may be supported by the UE. Alternatively, the UE may report or transmit the observed uplink timing difference according to each band combination among configured bands. Alternatively, the UE may report or transmit the observed uplink timing difference according to each band combination among indicated bands. Alternatively, may transmit the observed maximum uplink timing difference among the configured bands/configured carriers/configured cells. In this case, the observed maximum uplink timing difference may mean the timing difference between uplink cells having the maximum timing difference among cells observed by the UE. That is, when the UE observes the first and second cells and the timing difference between the uplink in the first cell and the uplink in the second cell has the maximum value among the timing differences observed by the UE, the timing difference between the uplink in the first cell and the uplink in the second cell may means the observed maximum uplink timing difference. The UE may report the uplink timing difference by a periodical method.

The network may configure whether the UE may transmit the information regarding the observed timing difference to the network. That is, the network may transmit information indicating whether the UE transmits the observed timing difference to the UE.

The UE may transmit the observed uplink timing difference to the network by a request by the network. That is, the UE may transmit the observed uplink timing difference to the network upon receiving the request by the network.

Alternatively, the UE may transmit the uplink timing difference when a reporting event is met. In this case, the reporting event may mean a case where the uplink timing difference exceeds the threshold among the configured cells or configured carriers, or a case where the uplink timing difference exceeds the threshold among the indicated cells or indicated carriers.

In this case, the network may configure whether to apply the options to the UE.

The configured cells or configured carriers may mean cells or carriers in which the network configures the aggregation for the UE.

Moreover, the indicated cells or indicated carriers may mean cells or carriers which instruct the network to report the timing difference to the UE.

Thereafter, the network determines a cell in which the carrier aggregation is available based on the information regarding the observed timing difference (S1320). That is, the network may determine a combination of the carrier aggregation which may be configured for the UE based on the information regarding the observed timing difference, which is received from the UE. In other words, the network may determine a combination of the primary cell and the secondary cell which may be configured for the UE based on the information regarding the observed timing difference, which is received from the UE.

The carrier aggregation combination which the network may configure for the UE may include the carrier aggregation between the cells having the timing difference which is the more than the maximum timing difference. That is, the network may perform the carrier aggregation between the cells within a timing difference of a limit which may be supported by the UE. Since the detailed contents of the carrier aggregation combination which the network may configure for the UE are described above, hereinafter, the detailed contents will be omitted.

The UE may receive the carrier aggregation configuration information from the network (S1330). In this case, the carrier aggregation configuration information may include information regarding the primary cell and the secondary cell in the carrier aggregation configured for the UE. Since the detailed contents of the carrier aggregation configuration information received by the UE are described above, hereinafter, the detailed contents will be omitted.

Thereafter, the UE may perform the uplink transmission through the secondary cell configured for the UE (S1340). The detailed contents regarding the case where the UE performs the uplink transmission through the secondary cell are described above.

Figure 14:
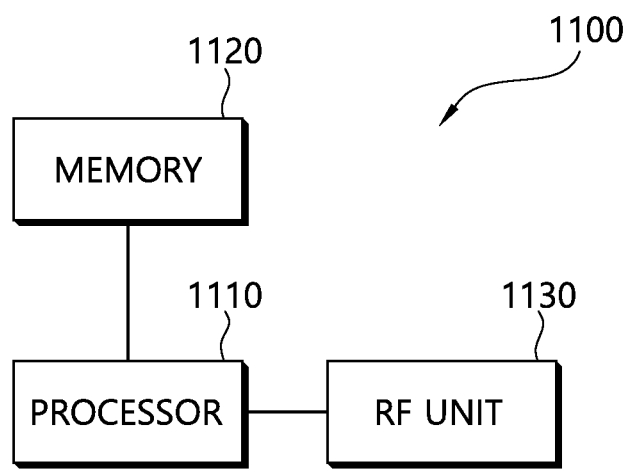
FIG. 14 is a block diagram illustrating a UE in which the embodiment of the present invention is implemented.

FIG. 14 is a block diagram illustrating a UE in which the embodiment of the present invention is implemented.

Referring to FIG. 14, the UE 1100 includes a processor 1110, a memory 1120, and a radio frequency (RF) unit 1130. The processor 1110 implements a function, a process, and/or a method which are proposed. For example, the processor 1110 may transmit information regarding a timing difference through the RF unit 1130.

Thereafter, the processor 1110 may receive carrier aggregation configuration information from a network through the RF unit 1130.

Thereafter, the processor 1110 may perform uplink transmission through a secondary cell configured through the RF unit 1130.

The RF unit 1130 is connected with the processor 1110 to transmit and receive a radio signal.

The processor may include an application-specific integrated circuit (ASIC), another chipset, a logic circuit and/or a data processing apparatus. The memory may include a read-only memory (ROM), a random access memory (RAM), a flash memory, a memory card, a storage medium, and/or other storage devices. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

What is claimed is:

1. A method for carrier aggregation performed by a user equipment (UE) in a wireless communication system, the method comprising:

transmitting information, to a network, on a timing difference informing the network of a UE timing difference and an observed timing difference;

receiving carrier aggregation setting information, in response to the information on the timing difference, from the network, wherein the carrier aggregation setting information includes information of an aggregation combination between cells, including a secondary cell, having a specific timing difference; and performing an uplink transmission through the secondary cell configured for the UE, based on the carrier aggregation setting information, wherein the UE timing difference is a maximum timing difference supported by the UE, and the observed timing difference is a timing difference, observed by the UE, between the cells, wherein the UE timing difference, the observed timing difference, and a threshold are bigger than a reference timing difference preconfigured by the network, wherein the specific timing difference is bigger than the reference timing difference, but smaller than or equal to the UE timing difference, wherein the UE transmits the information on the timing difference when both of the UE timing difference and the observed timing difference are larger than the threshold, and wherein the secondary cell is a cell in which the UE observes the observed timing difference.

2. The method of claim 1, wherein the information on the timing difference is included in a message informing a UE capability which the UE reports to the network.

3. The method of claim 2, wherein the information on the timing difference further includes information on an uplink timing difference for each band combination, which is enabled to be supported by the UE.

4. The method of claim 2, wherein a timing difference, having a specific value, is previously configured in the UE, and wherein the information on the timing difference includes a value of a timing difference additionally supported by the UE compared to the specific value of the timing difference.

5. The method of claim 1, wherein the information on the timing difference observed by the UE includes information on an uplink timing difference observed for each band combination which is enabled to be supported by the UE.

6. The method of claim 1, wherein the information on the timing difference observed by the UE is reported by an instruction from the network.

7. The method of claim 1, wherein when a reporting event occurs, the information regarding the timing difference observed by the UE is reported.

8. A user equipment (UE) for performing carrier aggregation in a wireless communication system, the UE comprising:
a transmitter and a receiver; and
a processor, operatively coupled to the transmitter and the receiver, wherein the processor is configured to:
control the transmitter to transmit, to a network, information on a timing difference informing the network of a UE timing difference and an observed timing difference,
control the receiver to receive carrier aggregation configuration information in response to the information on the timing difference, from the network, wherein the carrier aggregation setting information includes information of an aggregation combination between cells, including a secondary cell, having a specific timing difference, and
perform an uplink transmission through the secondary cell, configured for the UE, based on the carrier aggregation setting information,
wherein the UE timing difference is a maximum timing difference supported by the UE, and the observed timing difference is a timing difference, observed by the UE, between the cells,
wherein the UE timing difference, the observed timing difference, and a threshold are bigger than a reference timing difference preconfigured by the network,
wherein the specific timing difference is bigger than the reference timing difference, but smaller than or equal to the UE timing difference,
wherein the UE transmits the information on the timing difference when both of the UE timing difference and the observed timing difference are larger than the threshold, and
wherein the secondary cell is a cell in which the UE observes the observed timing difference.

9. The UE of claim 8, wherein the information on the timing difference is included in a message informing a UE capability, which the UE reports the network.

10. The UE of claim 9, wherein the information on the timing difference further includes information on an uplink timing difference for each band combination which is enabled to be supported by the UE.

11. The UE of claim 9,
wherein a timing difference, having a specific value, is previously configured in the UE, and
wherein the information on the timing difference includes a value of a timing difference additionally supported by the UE compared to the specific value of the timing difference.

* * * * *